March 12, 1968 C. S. MOOREFIELD 3,373,246

COUNTER-MEASURES SYSTEM FOR BLOCKING TELEPHONE LINES TO UNAUTHORIZED SIGNALS

Filed July 8, 1963 2 Sheets-Sheet 1

INVENTOR.

CARLTON SWAIN MOOREFIELD

March 12, 1968 C. S. MOOREFIELD 3,373,246

COUNTER-MEASURES SYSTEM FOR BLOCKING TELEPHONE LINES TO UNAUTHORIZED SIGNALS

Filed July 8, 1963 2 Sheets-Sheet 2

*INVENTOR.*
CARLTON SWAIN MOOREFIELD

United States Patent Office 3,373,246
Patented Mar. 12, 1968

3,373,246

COUNTER-MEASURES SYSTEM FOR BLOCKING TELEPHONE LINES TO UNAUTHORIZED SIGNALS

Carlton Swain Moorefield, Fairfax County, Va.
(6704 Edsall Road, Alexandria, Va. 22312)

Filed July 8, 1963, Ser. No. 293,497
5 Claims. (Cl. 179—2)

*Brief summary of the invention*

My present invention relates to a counter measures device for the protection of the telephone lines and telephone instrument or other devices which require electrical conductors to perform their function and which lead from a possible target area to other areas.

The principal object of the present invention is to protect these conductors from being used for any unauthorized use and specifically to protect the conductors from being used for the purposes of obtaining information concerning the nature of the activity being conducted in the protected areas or any sound originating in the protected area.

*Description of the figures in the drawing*

FIGURE 1 depicts four conductors of a 50 conductor cable. Three of the conductors, numbers 1, 2 and 50 show a light dependent element or circuit series connected into said conductors. Conductor number 3 shows a conductor with no elements connected to it. FIGURE 2 depicts two conductors, said two conductors being 1 and 2 of FIGURE 1. The conductors which lead to the left of the drawing go to some other station or to the central office of a communications system. The illustrative drawings and description are of a telephone system, such as is used in the United States. The circuitry which is shown in FIGURE 2 connected between the two conductors is for protection of the conductors and is more fully explained in the detailed description.

*Detailed description of the invention*

With the above and other objects and advantageous features in view my invention consists of a novel method and a novel assembly of parts, more fully described in the detailed description following in conjunction with the accompanying drawings and more particularly defined in the appended claims.

Figure 1:
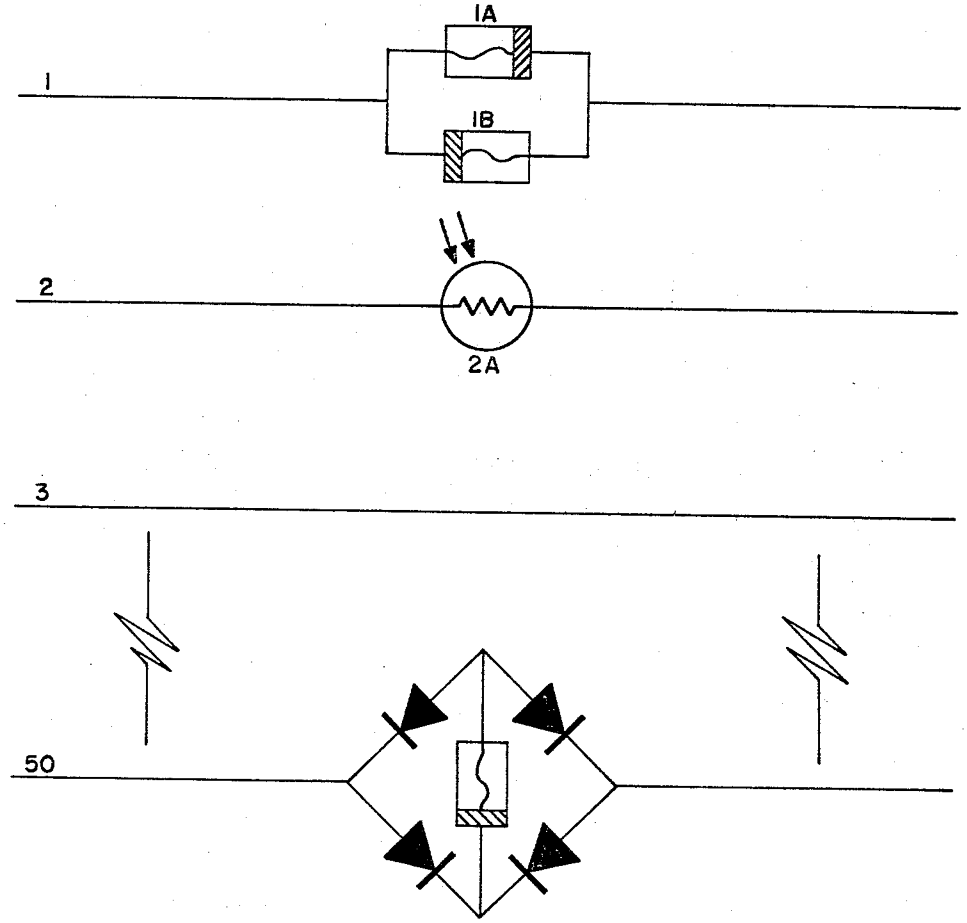
Figure 2:
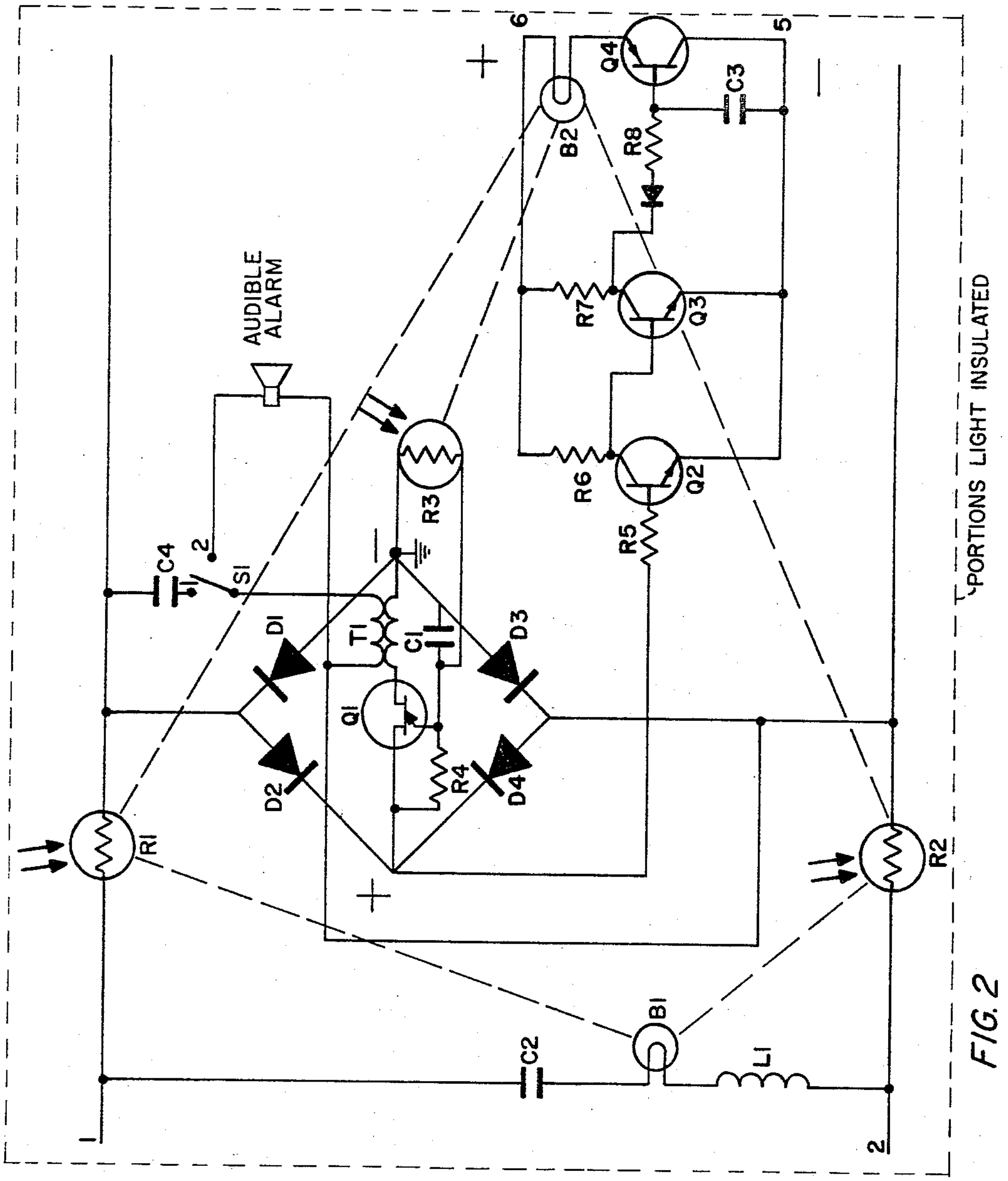

The FIGURES 1 and 2 are diagrams for illustrative purposes only of the present invention and means of implementing this invention.

In recent years many new developments have been made which seek to use existing electrical conductors such as are used in public telephones, telephone instruments or private line communication systems and terminals or other existing electrical conductors for purposes of obtaining information of the activity or audible sounds which occur in a target area.

These devices are used for purposes ranging from the most personal to industrial espionage and activities concerned with the national security. This problem is not a new one; however, my invention solves this problem in a new, novel, simple and useful manner.

No counter measure system has ever been designed to accomplish this end which was sufficiently effective and inexpensive to achieve wide spread use even among those persons or government groups most needful of this protection. Some of the most serious problems of such a counter measure system are that the techniques for using these conductors as a means of achieving some sort of penetration of a target area are very sophisticated and esoteric and exploit the same type of phenomena that the lines themselves are used for, thus making any counter measure against this unauthorized use, also effect the normal and needful use of the electrical conductors and purpose for which they were installed. Additionally, the voltage or power present on the conductors in the target area can be used to power devices to transmit the desired information from the target area by wire and wireless means yet for the conductors to be useful they must have a certain voltage to perform their intended function.

In the case of a telephone instrument which has multiple line pairs in the telephone cables or an intercommunication system you will often find a cable with as many as fifty conductors and for a single telephone two to four conductors. Since any combination of these conductors presents a threat to the area where they are located, it is obvious that the most desirable answer would be to, in some way such as a relay, effect a discontinuity in the conductor or conductors. This would achieve one of the desired ends; that is, a discontinuity of the conductor or conductors with complete isolation of the conductors themselves in relation to each other. The relay approach could work and is included in the invention; however, it presents many problems; one being that the contacts and their capacitive relationship could be used as a means of bypassing the relay and also one would have to find a means of causing the relay to close on the receipt of an incoming or ringing signal and then open if the telephone was not answered, plus the disadvantage of being a mechanical device in addition to size and cost which operate against the relay approach.

My invention has all the advantages of a relay while not possessing the disadvantages of a mechanical relay. My invention uses a light sensitive element as a so-called solid state relay or variable resistor to protect the conductors in the target area and can be implemented in the following manner:

We will assume for the illustration that we have a 50 conductor telephone cable either public or private which supplies all the needed voltage, etc., to a telephone instrument which has the ability to allow a person to select any one of four outside telephone pairs to make a call or to receive telephone calls on any one of four pairs of lines connected to his instrument from the telephone central office or to effect internal telephone calls between other extensions which are also connected to these four lines or to receive such calls from others on these same four telephone lines. We will assume arbitrarily that eight of these conductors are not used to effect these aforementioned functions of the telephone system, but are supplied in the cable since it was convenient for the telephone company or manufacturer to do so.

We shall assume also that the possessor of this telephone instrument would desire that the lines and the instrument itself be protected from any unauthorized use of these lines or telephone instruments for obtaining information of activity or sound from his office.

With my invention this could be achieved in the following manner. Reference is made to FIGURE 1.

In FIGURE 1 all lines coming from the left hand side of the drawing can be assumed as coming from the central telephone office or from some place outside the protected area. All lines leading toward the right hand side of FIGURE 1 can be assumed to enter the protected area and terminate in the telephone instrument in the protected area. A quick mathematical analysis will show you that if a person needs only two conductors to obtain information from this target area, that in a 50 conductor cable he would have 1,225 possible two conductor combinations to choose from. All needed lines coming from the central office in FIGURE 1, lines 1, 2, 3 and 50 only being shown on the drawing, are broken and a light sensitive element is series connected in each line at this point and contained in a light insulated container. The light insulated container is not shown since any form would serve the purpose and there are so many methods that it is not felt necessary to illustrate this point. There are a number of light sensitive elements which would perform well but for illustrative purpose I will assume the element to be a light activated switch such as the General Electric ZJ235D.

Line 1 is shown with the schematic symbol 1A and 1B used by General Electric to designate the ZJ235D, series connected in the line. Light sensitive elements 1A and 1B are parallel connected to illustrate one method of connecting this element where the line is used for alternating current. If the line only carries direct current or undulating direct current and is not subject to polarity reversal then a single element would be sufficient.

Line 2 shows a light sensitive resistor, 2A, series connected in thel ine. Since a light sensitive resistor is not polarity sensitive, only one is required regardless of the type voltage and current carried on the line.

Line 3 shows no break and no element in the line. This illustrates a line not useful to the function of the other conductors or instruments and would be removed or otherwise disabled from functioning as a conductor.

Line 50 shows another method of using a light sensitive element which is also polarity sensitive and the conductor must pass alternating current voltage or is subject to polarity reversal of some type.

The GE ZJ235D element has a maximum of 10 microamperes leakage in darkness, so for practical purposes we have in darkness an open circuit. In the presence of the proper intensity of light you have a diode conductor connected in the forward direction with a very low resistance or no practical resistance.

In a telephone circuit such as this example the arrival of a call is announced by the ringing of a bell. This is accomplished by the arrival of an alternating current voltage on at least two of the conductors, or one conductor and ground. This alternating current voltage may be on other conductors but it need be on only two to achieve its purpose of signalling that someone has called this telephone. Since all our 50 lines are effectively open we must close these two lines so that the signal may go through to the instrument. Reference is made to FIGURE 2 which is a blowup of lines 1 and 2 of FIGURE 1, but not of elements 1A and 1B.

We will assume that the incoming alternating current signal arrives at terminals 1 and 2. The type of signal announcing the arrival of a call will vary widely depending on the type of system; however, for this telephone we will assume that it is the normal 16 to 80 cycle alternating current at some voltage. In this case, the signalling alternating current conducts through inductor L1, C2, and B1 causing B1, an electric bulb, to produce light which causes light sensitive element R1 and R2 to close or lower resistance thus allowing this alternating current signal to pass on to the telephone instrument in the protected area and signal that someone has called this line. L1 is for the purpose of restricting the frequency of alternating current which would be allowed to activate B1. The use of filtering of some type at this point would be determined by type signal used to signal the presence of an incoming activity. Also the degree of protection needed or if you intend to use a noise generator as explained later in this patent application would have a bearing on the need for filtering here. These light sensitive elements R1 and R2 and lines may be light insulated from the other lines in the light insulated container.

In FIGURE 2, I have used a light sensitive resistor as the element seried in the line. It is understood that if I had used a polarity sensitive element it would be necessary to use some type of connection as shown in FIGURE 1, lines 1 and 50, to pass this alternating current. Only the two lines where the alternating current signal appears will open at this time since this light can be light insulated from the other light sensitive elements. The elements close only during the presence of the incoming alternating current signal passed by L1, C2 and B1. If the call is unanswered then lines 1 and 2 open again or become highly resistive at the termination of the arriving alternating current signal. If the telephone instrument is answered, then by lifting the handpiece or other actions as in a speak-o-phone setup where a button is pushed, then a light, B2, goes on activating the light sensitive elements which cause all the lines necessary to effect a telephone conversation to close or become less resistive, or if desired it can light close all the light sensitive elements on all the lines. What lines close would be up to the type of protection needed or desired. The light at the protecting point which is actuated by picking up the telephone handpiece can be physically a part of the cradle switch using existing conductors, added conductors or it could be the selector button switch to select a line or it could be a solid state telephone tap device which senses the voltage drop on the line or the resistance change introduced by connections internally made by lifting the telephone handpiece.

It is not felt necessary to show a mechanical switch actuating lamp B2 since this technique is so well known; rather I have illustrated a solid state telephone tap technique which electronically and automatically senses the action of lifting of the telephone cradle switch or other means of switching necessary to answer or initiate a telephone call.

R5, R6, R7, R8, Q2, Q3, Q4, D5, C3, and B2 make up this part of the circuit. Power for the light and circuit is at terminal 5 and 6 and power may be battery or direct current power supply. Power supply is not shown. The voltage on lines 1 and 2 appears as a positive voltage at a point between D2 and D4 and as a negative voltage of a point between D1 and D3. This voltage is connected to Q2 through R5 and terminal 5 or ground symbol. Q2 is a low signal device and when the voltage is the normal 50 volt direct current "on Hook" telephone voltage, this transistor is in a conducting state which turns Q3 and Q4 off. When the voltage on lines 1 and 2 drops because of the telephone hook switch closing then Q2 no longer conducts and Q3 and Q4 are turned on and conduct thus B2 illuminates. C3 is a capacitor to prevent Q4 from following the dial pulses as a telephone call is being dialed on a dial instrument even when Q2 and Q3 are turned on and off by these voltages changes made by the dialing of a number.

There are a number of other possible ways to sense this action and automatically turn the light on to activate the light sensitive elements so that the appropriate lines may close.

The important thing is that the light sensitive elements are isolated from one another and receive their signal to close from a source which is not connected directly to them.

For a telephone system such as we are discussing there is adequate power available in the alternating current signal to supply power for the light and also ring the bell. There are communication systems where the incoming signal would not be of strong enough power to activate the light and also supply signal power of the presence of an incoming call. In these cases there are several methods of detecting this signal without using the signal itself to power the light. One element would be a SCS which requires only .4 volt at 1 microampere to gate the SCS into a conductive state. You could use a capacitor and diode if the signal is alternating current or a Zener diode to detect an increase in direct current level if the signal is direct current. In either case this detection is used to gate the SCS or other device into conduction, and light the light using external power to power the light.

It might also be desirable to have an automatic device to detect if the light sensitive elements are conducting when they should not be conducting or if some foreign voltage is present on the protected lines.

One technique for this is illustrated in FIGURE 2.

This circuit is made up of D1, D2, D3, D4, C4, T1, Q1, R4, R3, and C1 and C4. Again there is negative direct current voltage appearing between D1 and D3 and a positive direct current voltage appearing between D2 and D4 if there is any voltage on lines 1 and 2 regardless of the polarity of this direct voltage or if alternating current is on lines 1 and 2.

For illustrative purposes I have chosen a unijunction transistor in a relaxation oscillator circuit as a noise generator. This circuit receives power when power is available from the terminals between D1 and D3 and between D2 and D4. The polarity should be as shown. It is drawn in FIGURE 2 so that R3, a light sensitive element, could be toward B2. When power is available on lines 1 and 2 on the instrument side of light sensitive elements R1 and R2 then C1 charges through R4 and gates Q1 which conducts through the primary of T1, thus creating a pulse of power in the secondary of T1 which is coupled onto lines one and two through C4. R4 restricts the power available to C1 thus controlling its charging rate and ability to gate Q1. The capacitor C1 which charges through R4 is shunted with light sensitive element R3. When R3 is in darkness it is highly resistive and cannot sufficiently shunt C1 to keep it from charging and gating Q1. When R3 is illuminated, its resistance is lowered and it shunts C1 with a sufficiently low resistance to prevent C1 charging and gating Q1 and oscillating. Then if any power is on the line but B2 is not illuminated, then this circuit oscillates and puts a noise level on lines 1 and 2, but if B2 is illuminated as when a call is answered or to be made then R3 shunts C1 and cuts the oscillator off.

The circuit can not oscillate when there is no current available to charge C1. If there is no power on lines 1 and 2, which would be normal, then no oscillation or alarm occurs, but if there is a foreign voltage present or the light sensitive elements R1 and R2 have not opened or become sensitive then this oscillator conductor and puts noise on the line or performs some function; i.e., signal an alarm, light a light, generate noise, etc.

It would be useful in understanding the utility of this present device to illustrate its implementation from the operational point of view. Assume the use of the U.S. Secretary of State's office since the Secretary obviously represents an audio intelligence target for the enemies of the U.S. Because of security control and physical plant characteristics it would be difficult for an enemy agent to plant or cause a plant to be made of a microphone and run the wire from the Secretary's office to some listening post. There are difficulties also if the enemy agent should seek audio intelligence through RF carrier means by planting a wireless transmitter and microphone.

Because of the great utility of a telephone instrument, the Secretary of State has a telephone instrument in his office. Thus the telephone company has run wires into and terminated them in an instrument capable of picking up audio information in the Secretary's office. The telephone company has a switch in this instrument which closes only when the Secretary receives a call or wishes to make a call. Because the telephone company wished their instrument to be useful and trouble free they built large tolerances into the components and circuitry so that environmental conditions would not cause malfunctions. Since the telephone instrument is not a source of power itself, the telephone company provides a DC voltage potential on at least two conductors, so that when the Secretary picks up the instrument ot make a call, thus closing the instrument switch, this voltage potential circuit is closed and DC current flows causing other action in the central office which then permits the call to be made. When the Secretary receives a telephone call, a signal of a certain character (in the U.S., often 120 v. AC, at 20 Hz.) appears from the central office which rings the bell in the instrument. The audio information in a telephone system is often the undulations of the aforementioned DC current caused by a carbon microphone with no electronic amplification. It will not further be useful to describe a telephone system because its function and methods are well understood.

Now, the enemy agent wishes audio intelligence from the Secretary's office. All he need do in the simple case is to shunt, or cause to be shunted, the switch in the Secretary's instrument with a resistance. This resistance must be large enough not to cause any reaction in the telephone office but small enough to permit a current to flow through the carbon microphone. A 10K ohm resistance will not disturb the telephone function in any manner and will permit a sufficient flow of current to be useful to the enemy agent. The enemy agent would at the same time shunt this resistance with a suitable capacitor to permit an easy flow of the AC portions of the now undulated DC current supplied by the telephone company. This AC component is the audio information occuring in the Secretary's office and the central office. This simple audio craft positive technique would be easily detected by trained personnel; however, there are at least 10 systems which exploit the existence of these conductors which are not easily detected and represent a severe threat to security. These additional systems are not described here because this portion is intended to only show operational utility of the present device, in one real life situation.

The Secretary wishes a defense against this possible audio instrusion into his office and employs the present invention for that purpose. The present invention would be installed outside the Secretary's office and before the conductors reached the central office, because the present invention generally offers protection against hostile use of the conductors only forward from where it is installed, to and into the telephone instrument. One can readily see that if the present invention were employed that the above cited positive audio-craft device could not work because the light dependent resistors, R1 and R2 of FIGURE 2 are highly resistive when the telephone instrument is in an on-hook position and so severely limit the current that even though the telephone instrument switch has been shunted no useful current flows. The enemy agent realizes that some protective device is being employed and seeks to defeat it. The agent knows that for the telephone to be useful it must respond to the ringing signal from the central office so he supplies his own signal of this type in order to open the circuit to the instrument; but he doesn't want to ring the bell so he limits voltage and current of his AC signal in the hope that he can find the point where his signal will cause the conductors to become useful but not give any indication that he has such a signal on the conductors. The device receives this foreign signal and if the signal meets the requirements of C2 and L1 of FIGURE 2 with sufficient amplitude to cause B1 to light then this signal will also ring the bell in the telephone instrument.

If the agent has so limited his signal so that it cannot supply enough power to ring the bell then it cannot light B1 of FIGURE 2. Let us assume however that the agent has discovered a signal which will not ring the bell but will actuate B1 of FIGURE 2 to a small degree and make R1 and R2 of FIGURE 2 less resistive then with no light. In this case, now that some current can be delivered through R1 and R2, this current is detected through D1, D2, D3 and D4 to power the oscillator in FIGURE 2 to create an electronic noise on the conductors thus creating a very unfavorable signal to noise ratio for the detection of any signal from the Secretary's office.

Now let us assume that the enemy agent abandons his efforts from the central office side of the protective device and decides that he has sufficient operational assets to make an installation between the device and the Secretary's office. Again, he must supply his own power since the power from the central office is limited by the protective device. In this case the D1, D3 and D4 detect this foreign energy and create an electronic noise on the conductors which is proportional in amplitude to the foreign voltage applied, creating a very unfavorable signal to noise ratio.

In operational employment, the protective device would probably be just outside the secretary's office in the reception area and might even be unpluged and put into the safe at night to prevent tampering.

The present system like any protective device is dependent upon proper employment to gain the maximum protection afforded.

In this case, the light sensitive element which shunts the capacitor C1 would be light isolated from the light which is activated by the presence of an incoming call or activity, thus making it impossible for anyone to make effective use of power available even if they should be successful in causing the light to light which should only light for a proper incoming signal.

I claim:

1. A protective device for a conductor of a communication instrument which uses a plurality of conductors as a signal and carrier means comprising,
 light dependent elements series connected into said conductors,
 means for insulating said elements for unwanted light,
 a source of light within said insulating means,
 means for detecting the signal used to announce an incoming call,
 means connected to said means for detecting the signal to cause said light source to illuminate light dependent elements, said illumination decreasing the resistance of said light dependent elements, means for detecting electrical energy on said conductors,
 means connected to said electrical energy detector means for generating a noise signal in response to a predetermined amount of said electrical energy,
 means for deactivating said noise generator under predetermined conditions in said conductors.

2. The protective device of claim 1 further comprising means connected to said electrical energy detecting means for generating an alarm signal in response to a predetermined amount of deliverable electrical energy.

3. The protective device of claim 1 further comprising means for controlling the electrical signal to said source of light within said insulating means.

4. The protective device of claim 1 further comprising means for selectively illuminating said light dependent elements.

5. The protective device of claim 1 further comprising a device controlling the conductivity of said conductors.

References Cited

UNITED STATES PATENTS

| | | | |
|---|---|---|---|
| 2,740,196 | 4/1956 | Ehinger | 30—186 |
| 3,020,529 | 2/1962 | Turner | 340—253 |
| 3,038,080 | 6/1962 | Matarese | 340—253 X |
| 3,158,713 | 11/1964 | Margulies | 340—250 X |

ROBERT L. GRIFFIN, *Primary Examiner.*

DAVID G. REDINBAUGH, JOHN W. CALDWELL, *Examiners.*

J. T. STRATMAN, *Assistant Examiner.*